(12) United States Patent
Naito et al.

(10) Patent No.: US 7,427,198 B2
(45) Date of Patent: Sep. 23, 2008

(54) OPTICAL COMPONENT MOLDING APPARATUS

(75) Inventors: Atsushi Naito, Aichi-ken (JP); Kanji Sekihara, Toyokawa (JP); Yoshihiro Okumura, Toyohashi (JP); Akihiko Matsumoto, Toyokawa (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/257,723

(22) Filed: Oct. 25, 2005

(65) Prior Publication Data

US 2006/0093704 A1 May 4, 2006

(30) Foreign Application Priority Data

Oct. 29, 2004 (JP) ............................. 2004-316623
Oct. 29, 2004 (JP) ............................. 2004-316727

(51) Int. Cl.
*B29D 11/00* (2006.01)
(52) U.S. Cl. ...................................... 425/572; 425/808
(58) Field of Classification Search ................ 425/190, 425/567, 588, 808, 572; 264/328.8
See application file for complete search history.

(56) References Cited

U.S. PATENT DOCUMENTS

| | | | | |
|---|---|---|---|---|
| 4,900,242 | A * | 2/1990 | Maus et al. | 425/149 |
| 6,210,610 | B1 * | 4/2001 | Saito et al. | 264/2.2 |
| 2005/0153013 | A1 * | 7/2005 | Lee | 425/552 |

FOREIGN PATENT DOCUMENTS

| | | |
|---|---|---|
| JP | 05-058247 | 8/1993 |
| JP | 05-329905 | 12/1993 |
| JP | 06-039882 | 2/1994 |
| JP | 10-193396 | 7/1998 |
| JP | 11-042685 | 2/1999 |
| JP | 11-300463 | 2/1999 |
| JP | 2001-124902 | 5/2001 |
| JP | 2001-166108 | 6/2001 |
| JP | 2001-001374 | 9/2001 |
| JP | 2001-272501 | 4/2002 |

(Continued)

OTHER PUBLICATIONS

English abstract and computer translation for JP 2003-245946.*

(Continued)

*Primary Examiner*—Tim Heitbrink
(74) *Attorney, Agent, or Firm*—Brinks Hofer Gilson & Lione

(57) ABSTRACT

An apparatus for molding optical components of a small size and high precision is provided with good transferability and a reduced production cycle. This apparatus includes a plurality of runners arranged in a pattern allowing multi-cavity molding for molding plastic lenses each having an outer diameter of 2 mm to 12 mm and surface roughness Ra of 20 nm or less. The total projected area of the runners is determined within a range of 1 cm$^2$ to 12 cm$^2$. The runners are arranged to extend around a sprue in directions perpendicular to an outer surface of the base molds. The pattern of the runners extending from the junction with the sprue to each shape transfer section is configured in two intersecting directions. A cavity is of a rectangular outer shape when seen from a pressure contact surface side.

10 Claims, 22 Drawing Sheets

FOREIGN PATENT DOCUMENTS

| | | | |
|---|---|---|---|
| JP | 2002-240108 | | 8/2002 |
| JP | 2003-114368 | | 4/2003 |
| JP | 2003-245946 | * | 9/2003 |
| JP | 2003-276059 | | 9/2003 |
| JP | 2004-001309 | | 8/2004 |

OTHER PUBLICATIONS

Herbert Rees, Understanding Injection Molding Design, 2001, Hanser Publishers, pp. 59, 63 and 64.*

International Search Report for International Application No. PCT/JP2005/019096 dated Jan. 24, 2006.

* cited by examiner

OPTICAL COMPONENT MOLDING APPARATUS

CROSS-REFERENCE TO RELATED APPLICATIONS

This application is based upon and claims the benefit of priority from each of the prior Japanese Patent Applications No. 2004-316623 and No. 2004-316727 both filed on Oct. 29, 2004, the entire contents of which are incorporated herein by reference.

BACKGROUND OF THE INVENTION

1. Field of the Invention

The present invention relates to an optical component molding apparatus for molding optical components and, more particularly, to an optical component molding apparatus for molding optical components each of which has a small size (an outer diameter of 2 mm to 12 mm) and high precision (surface roughness Ra of 20 nm or less).

2. Description of Related Art

Recently, optical components such as objective lens are formed in a manner of injection molding using a thermoplastic resin (refer to, for example, Patent Documents 1 and 2). Since, by molding optical components using a plastic, products of uniform configuration can be produced quickly, the molding is suitable for mass production thereof. Optical instruments utilizing the plastic lens have a tendency toward miniaturization and higher performance from year to year. Accompanying this, requests for miniaturization and higher precision of the plastic lens are also increasing.

[Patent Document 1] Japanese Published Unexamined Patent Application No. 11 (1999)-42685

[Patent Document 2] Japanese Published Unexamined Patent Application No. 2001-272501

Further, as a technique for mass production of optical components, there has been studied a so-called multi-cavity molding technique for molding a plurality of molded products (molded articles) in a single mold-clamping and resin-injecting operation. A mold used for the multi-cavity molding has a single sprue centrally provided in a fixed mold and a plurality of runners arranged around the sprue. That is, lens transfer sections are symmetrically arranged around the sprues. In this multi-cavity molding technique, how to increase the number of molded products while reducing variations in transferability to each transfer section has a large influence on commercial profit.

However, the above multi-cavity molding of small-sized and high-precise optical components would be problematic in the following points. Good transferability is required for molding such small-sized and high-precise optical components. For this purpose, runners in the multi-cavity molding machine have a large thickness (diameter). In such runners with a larger diameter, however, it takes a long time to solidify resin in each runner. In other words, the cooling time (duration) is determined depending on the time needed for solidifying the resin in each runner. This makes it difficult to shorten a production cycle.

In the injection molding machine, generally, the optical characteristics of the molded optical components are likely influenced largely from processing accuracy of the molds, face shift (misalignment of lens surfaces in a direction perpendicular to an optical axis of the lens) and tilt (angular misalignment of the lens surfaces with respect to the optical axis) resulting from distortion of the molds which may be caused when the molds are brought into pressure contact with or separated away from each others. In the case where the optical components are to be produced, it is necessary to precisely evaluate eccentricity of the molded products and position adjustment of a transfer member. These conditions become more difficult as smaller-sized molded products are to be molded.

SUMMARY OF THE INVENTION

The present invention has been made to overcome at least one of the above problems in the conventional optical component molding apparatus and to provide an apparatus for molding optical components of a small size and high precision and capable of achieving good transferability and shortening a production cycle as well.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided an optical component molding apparatus for producing a plurality of optical components, the apparatus comprising: a fixed mold; and a movable mold which is brought into contact with and separated away from the fixed mold; wherein the fixed mold and the movable mold in a contact state under pressure provide runners having a total projected area determined in a range of 1 $cm^2$ to 12 $cm^2$ and shape transfer section in which a resin material is injected through the runners to produce the plurality of optical components, each of which having an outer diameter of 2 mm to 12 mm and an optical surface with surface roughness of 20 nm or less, and at least four optical components are molded in one mold-clamping operation.

To be concrete, in the optical component molding apparatus of the invention is structured to mold optical components each of which has a small size (an outer diameter of 2 mm to 12 mm) and high precision (surface roughness Ra of 20 nm or less). This is a multi-cavity molding machine for molding at least four articles in a single mold-clamping operation. The number of articles to be molded is preferably 16 or less in order to provide good transferability. In the optical component molding apparatus of the invention, the total projected area of the runners in the molds for molding the above optical components is determined in a range of 1 $cm^2$ to 12 $cm^2$. The runner diameter and length are determined to achieve the projected area. If the total projected area of the runners is 12 $cm^2$ or less, the time needed for cooling and solidifying the resin in each runner becomes shorter. If the projected area is 1 $cm^2$ or more, good transferability can be ensured. Accordingly, the total projected area has to be determined within the above range to achieve the good transferability and shorten the production cycle. Further, since each runner has a small volume, material costs for waste materials can be reduced.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings.

DETAILED DESCRIPTION OF THE PREFERRED EMBODIMENTS

A detailed description of preferred embodiments of the present invention will now be given referring to the accompanying drawings. In the present embodiments, the present invention is applied to a molding machine for plastic lens. A product (article) to be molded is a plastic lens that has an outer diameter of 2 mm to 12 mm and an optical surface of surface roughness Ra of 20 nm or less. This plastic lens includes a lens portion and a flange portion formed on the periphery of the lens portion. The flange portion is a part to be supported by a lens holder or the like. Such plastic lens is usable in an optical-pickup optical system in an optical pickup device, an imaging optical system of a cellular phone with a built-in camera, and others. For the optical pickup optical system, in particular, the plastic lenses each having an outer diameter of 2 mm to 7 mm need be produced with high precision and in mass production. Thus, the present invention is suitable for molding of such plastic lenses.

First Embodiment

Figure 1:
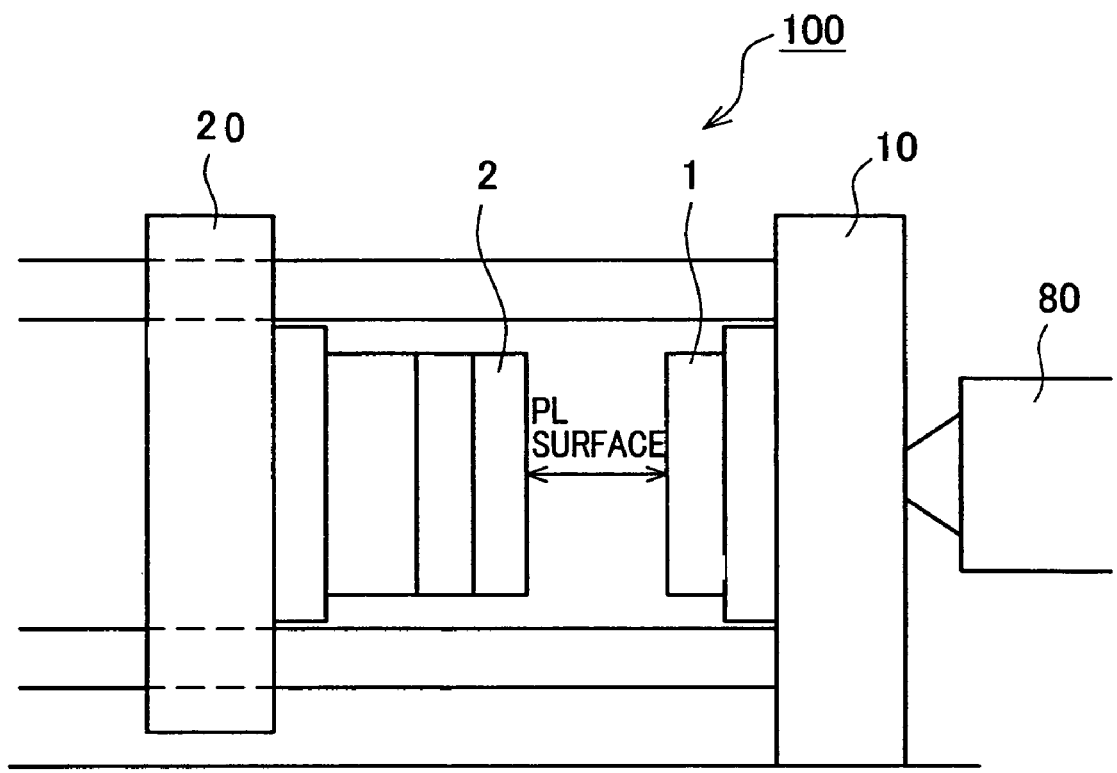
FIG. 1 is a view schematically showing a structure of a plastic lens molding machine (that molds are in a separated state) in a first preferred embodiment.
Figure 2:
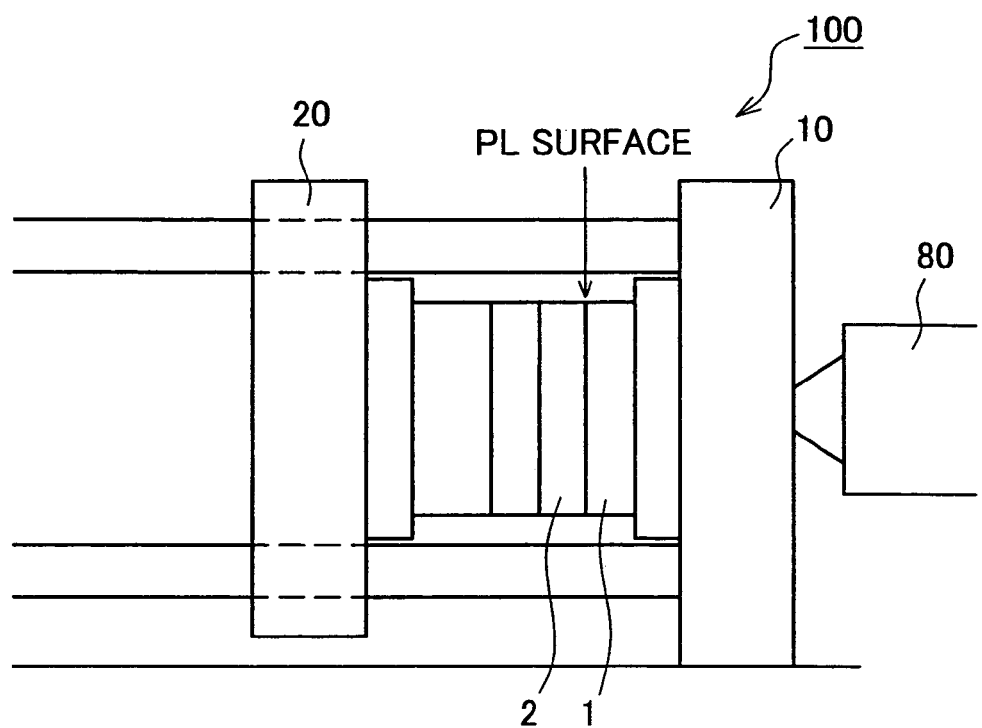
FIG. 2 is a view schematically showing the structural of the plastic lens molding machine (that the molds are in a contact state under pressure)
Figure 3:
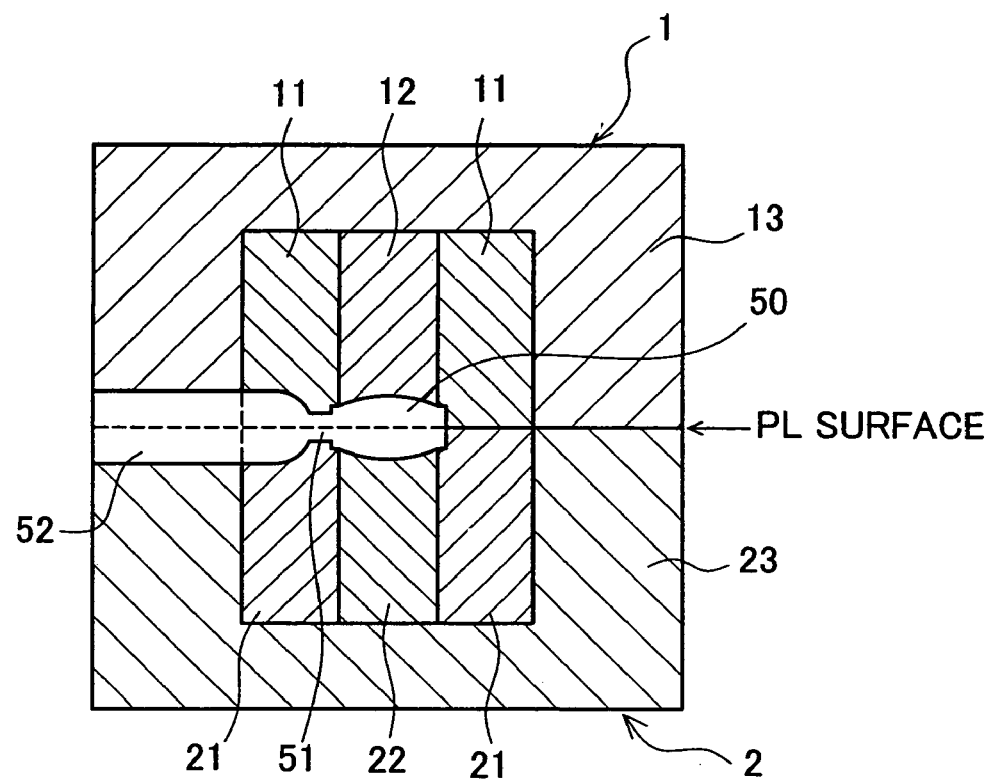
FIG. 3 is a sectional side view schematically showing a structure of molds for plastic lens.
Figure 4:
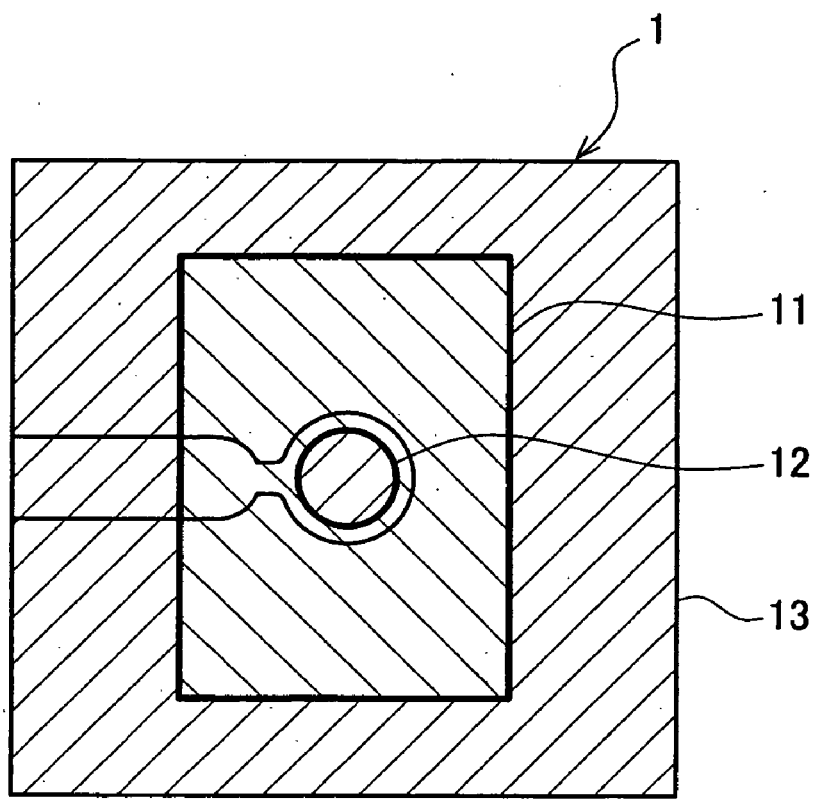
FIG. 4 is a view showing a pressure-contact surface of a mold for plastic lens in the first embodiment.
Figure 22:
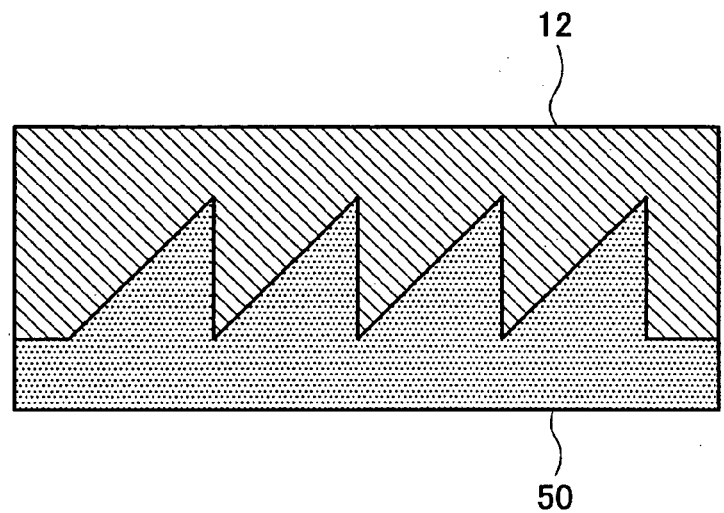
FIG. 22 is a view explaining the transferability for the diffractive lens, showing good transferability.
Figure 23:
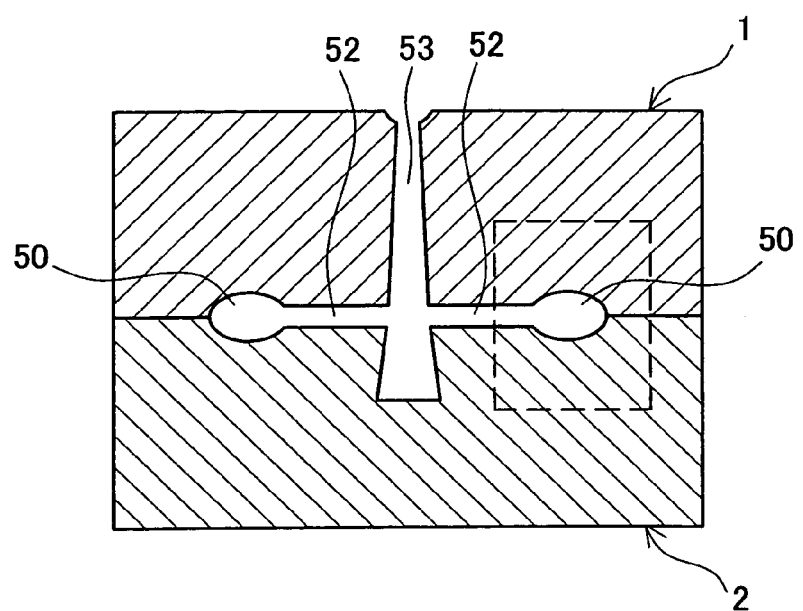
FIG. 23 is a sectional view showing an entire structure of the molds.

FIGS. 1 and 2 schematically show a structure of a molding machine 100 in the present embodiment; specifically, FIG. 1 shows a separate state of molds and FIG. 2 shows a pressure contact state of the molds. FIGS. 3, 4, and 22 schematically show a structure of the molds; specifically, FIGS. 3 and 23 show a sectional side view of the molds in the pressure contact state and FIG. 4 show a pressure-contact surface of a fixed mold. It is to be noted that FIG. 3 is an enlarged view of a part indicated by a broken line in FIG. 23.

To be concrete, as shown in FIG. 1 or 2, the plastic lens molding machine 100 in the present embodiment includes a fixed platen provided with a fixed mold 1 and a movable platen 20 provided with a movable mold 2 which can be brought into contact under pressure and separated away from the fixed mold 1. The molding machine 100 in the present embodiment is a compact molding machine capable of generating a mold-clamping force of the order of 15 tons (150 kN.

The fixed platen 10 is formed with an inlet through which molten resin is injected from an injection unit 80 into the mold 1. This injection unit 80 may be either a preplasticization type or an in-line screw type.

The molding machine 100 is structured as shown in FIG. 3 such that a cavity 11 is inserted in a base mold 13 of the fixed mold 1 and further a core 12 is inserted in the cavity 11. Similarly, a cavity 21 is inserted in a base mold 23 of the movable mold 2 and further a core 22 is inserted in the cavity 21. That is, the cavity and core are structured as an insert in the base mold. In this specification, a member formed with a transfer section for forming the lens portion of a plastic lens will be referred to as the "core" and a member formed with a transfer section for forming the flange portion arranged on the periphery of the lens portion will be referred to as the "cavity". Further, molds which support the transfer section (core and cavity) will be referred to as "base molds".

The base mold 13 is of a rectangular outer shape as seen from the pressure-contact surface (PL face) side. Further, cavity 11 is also of a rectangular outer shape as seen from the pressure-contact surface as shown in FIG. 4. The cavity 11 is arranged such that each outer surface of the cavity 11 is parallel to each corresponding outer surface of the base mold 13. The core 12 is of a circular outer shape as seen from the pressure-contact surface side. The movable mold 2 is identical in structure to the base mold 13.

The base mold 13, specifically, is provided with a pocket (recess) to receive the cavity 11. This pocket is formed to have a slightly larger width than the width of the cavity 11. A gap generated between the cavity 11 and the base mold 13 when the cavity 11 is inserted in the base mold 13 is filled with a spacer block. This spacer block serves to adjust the position of the cavity 11 and also fix the cavity 11. The adjustment of position of the cavity 11 will be mentioned later in detail.

When the movable mold 2 is brought into pressure contact with the fixed mold 1, a void is generated in the combined molds 1 and 2 (see FIGS. 3 and 23). This void provides a shape transfer section 50, a gate 51, a runner 52, and a sprue 53 forming a flow channel through which molten resin is allowed to flow from the inlet to the runner 52.

Preferably, the surface of the transfer section of a transfer member (core or cavity) should be applied with metallic plating. A metallic plated layer is formed to have a predetermined thickness in a range of 10 μm to 100 μm. To provide an optical path difference providing structure (e.g., a diffractive lens) on a transfer surface, it is preferable to provide it by machining (cutting) the plated layer. For improving mold releasability and protecting molds, a surface treatment using chromium nitride, titanium nitride, diamond-like carbon (DLO, etc. may be applied. This makes it possible to enhance flowability of resin in the mold during molding and transfer, and separability (mold releasability) of molded products from the molds.

In this specification, the "optical-path difference providing structure" means a structure constituted of a central area including the optical axis and a plurality of circular zones segmented with minute steps outside the central area, which has the following characteristics. That is, at a predetermined temperature, between the adjoining circular zones, the optical-path difference of the integral multiple of the wavelength of an incoming beam is generated, and when the temperature changes from the predetermined temperature, accompanying the changes in the refractive index, the optical-path difference generated between the adjoining circular zones displaces from the integral multiple of the wavelength of the incoming beam. The particular structure of the "optical-path difference providing structure" is a structure as described below. That is, for example, the circular zone neighboring outside the central area is formed being displaced in the direction of the optical axis so that the optical length is elongated with respect to the central area; the circular zones within the maximum effective diameter position are formed being displaced in the direction of the optical axis so that the optical length is elongated with respect to the circular zone neighboring the outside thereof, and the circular zones within the position of 75% of the maximum effective diameter are formed being displaced in the direction of the optical axis so that the optical length is shortened with respect to the circular zone neighboring the inside thereof and the circular zone neighboring the outside thereof.

The following explanation will be made on a process of producing plastic lenses by means of the molding machine 100 in the present embodiment. It is to be noted that the molding machine 100 in the present embodiment is configured as a multi-cavity molding machine to simultaneously produce a plurality of plastic lenses, but the following description will be made on one plastic lens to be molded for convenience of explanation. In this molding machine 100, in a state that the two molds are held in pressure contact with each other, molten resin is injected into the shape transfer section 50 through the sprue, the runner 52, and the gate 51 in this order. After the resin injected into the molds is distributed around the shape transfer section 50 and then cooled and solidified, the movable mold 2 is separated away from the fixed mold 1. A molded product is ejected by an ejector or the like. This ejected molded product integrally consists of a plastic lens body, a flange portion arranged on the periphery of an optical surface of the plastic lens body, and other portions corresponding to the sprue 53, the runner 52, and the gate 51. The portion corresponding to the gate 51 is cut out in a later cutting process. Thus the plastic lens is produced.

As for the molding conditions for plastic lens, for example, in the case where an amorphous polyolefin resin is used as the molten resin, the temperature of the molds is 120° C.; the temperature of the resin is 280° C.; the injection speed is 50 mm/sec; and the dwelling pressure is 100 MPa. The amorphous polyolefin resin may include Zeonex® (Zeon Corporation) and Apel® (Mitsui Chemicals).

As for the plastic resin used in the molding machine 100 in the present embodiment, a transparent resin material ordinarily used as an optical material may be adopted. For example, preferably, appropriate resins set forth in Japanese patent applications Nos. 2004-144951, 2004-144953, 2004-144954, and others may be used. In particular, the resins may include acrylic resin, cyclic olefin resin, polycarbonate resin, polyester resin, polyether resin, polyamide resin, polyimide resin, and the like.

The refractive index of plastic resin decreases as the temperature rises, whereas the refractive index of most of inorganic particles increases as the temperature rises. Here, there is known a technique to prevent the refractive index from changing by causing the above two characteristics to act so as to negate each other. For the above purpose, inorganic particles of 30 nm or less, preferably, 20 nm or less, further preferably, within a range of 10 to 15 nm are dispersed in the resin as a base material.

The following explanation is made on the multi-cavity molding for plastic lenses. The plastic lens molding machine 100 in the present embodiment is configured to mold four to sixteen molded products in a single mold-clamping operation. Further, in this molding machine 100, a total projected area of all runners 52 is determined within 1.0 cm$^2$ to 12.0 cm$^2$. A diameter and length of the runner are determined to realize the projected area in the above range.

Figure 5:
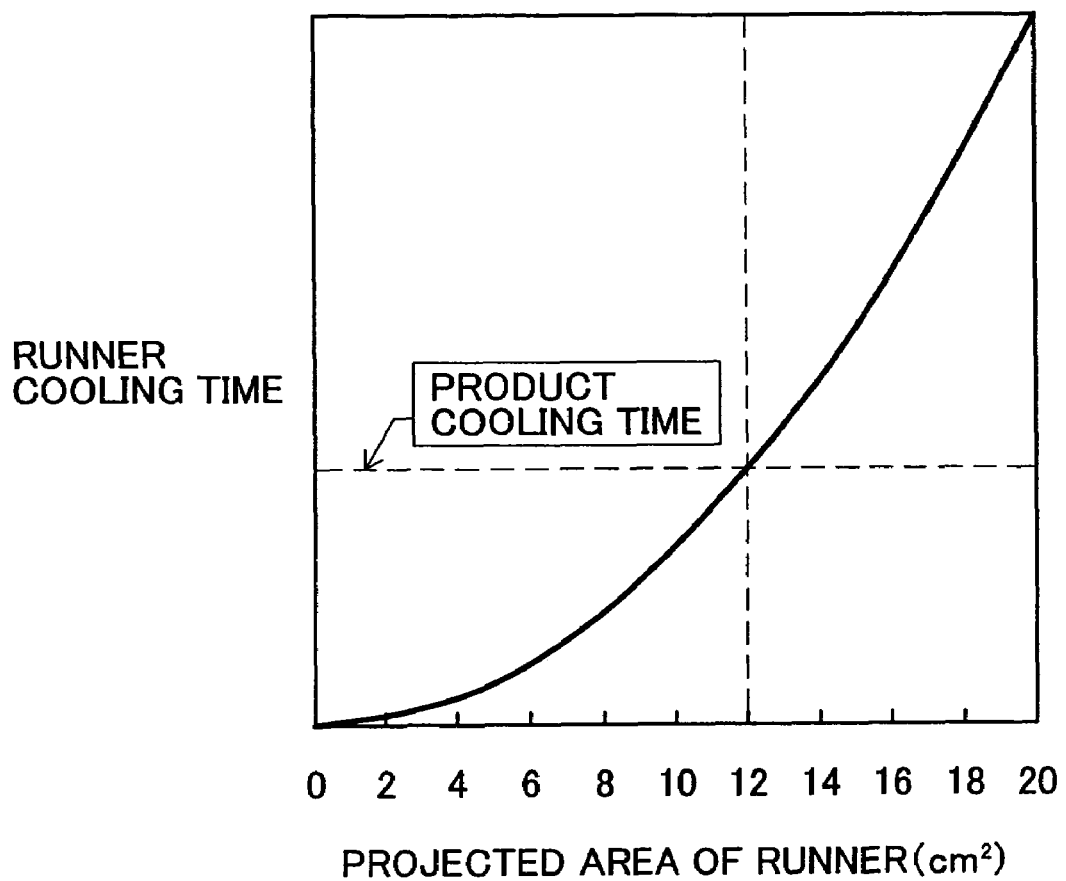
FIG. 5 is a graph showing a relation between a cooling time for a runner and a projected area of the runner.

The present applicant has experimentally found a link between the cooling time of resin in the runner and the projected area of the runner. FIG. 5 is a graph showing this relation. It is to be noted that the cooling time of a product part varies with the thickness of a molded product (plastic lens). The molding machine in the present embodiment is directed to lenses for use in a photographing optical system of a cellular phone and an optical-pickup optical system. Such lens is about 1 mm in thickness. Accordingly, the thickness of the product part in this example is 1 mm.

As shown in FIG. 5, the cooling time of the runner is shorter than the cooling time of the product part when the total projected area of the runners is 12 cm$^2$ or less. The runner is cooled faster than the product part accordingly. Thus, the cooling and solidifying time of resin in the runner has no influence on the production cycle time. When the total projected area of the runners is more than 12 cm$^2$, in contrast, the cooling time of the runner is longer than the cooling time of the product part. It is therefore necessary to provide a cooling waiting time of the runner, resulting in a longer production cycle time.

The applicant has further evaluated the relation between the transferability to the shape transfer section and the projected area of the runner. Table 1 shows evaluation results of efficiency percentage of products for the total projected area (unit: cm$^2$) of the runners:

TABLE 1

| | Projected area of runner (cm2) | | | | | | | | | | |
|---|---|---|---|---|---|---|---|---|---|---|---|
| | 0.1 | 0.5 | 0.7 | 0.8 | 0.9 | 1.0 | 1.1 | 1.2 | 1.3 | 1.5 | 2.0 |
| Evaluation results | x | x | x | Δ | Δ | ○ | ○ | ○ | ○ | ○ | ○ |

As shown in Table 1, when the total projected area of the runners was 1.0 cm$^2$ or more, the efficiency percentage was high and a good result was obtained (Evaluation result: O). For the total projected area of the runners of 0.8 cm$^2$ and 0.9 cm$^2$ respectively, the efficiency percentage was low and a good result was not obtained (Evaluation result: Δ). For the total projected area of the runners of 0.7 cm$^2$ or less, the efficiency percentage was very low and also yields was low (Evaluation result: x).

As the total projected area of the runners 52 is less than 1.0 cm$^2$, the runner diameter becomes smaller inevitably. This may cause a deterioration of the transferability to the shape transfer section 50. As the total projected area of the runners 52 is more than 12.0 cm$^2$, on the other hand, the runner diameter becomes larger inevitably. This may cause a longer cooling and solidifying times of resin in the runner 52, resulting in a longer production cycle time. Consequently, it is preferable to determine the total projected area of the runners 52 in a range of 1.0 cm$^2$ to 12.0 cm$^2$ in order to achieve transferability while shortening the production cycle time.

The molds in this embodiment centrally include a single sprue. Around this sprue there are provided a plurality of runners 52 extending in directions parallel/perpendicular to the outer surface of the base molds. Each runner 52 is branched once, twice, or three times between the sprue and the shape transfer section 50. The runner 52 is shaped like a letter T at each branch point to thereby distribute molten resin uniformly. Specifically, the pattern of the runner 52 is configured in two perpendicularly intersecting directions. Each runner extending from the junction with the sprue to each shape transfer section 50 is of almost the same length.

The pattern of the runners 52 for the multi-cavity molding will be exemplified below referring to FIG. 6 (4-cavity), FIGS. 7A and 7B (8-cavity), and FIGS. 8A and 8B (16-cavity), respectively. Those patterns are merely examples, and the configuration of core and cavity is not limited to the following patterns.

Figure 6:
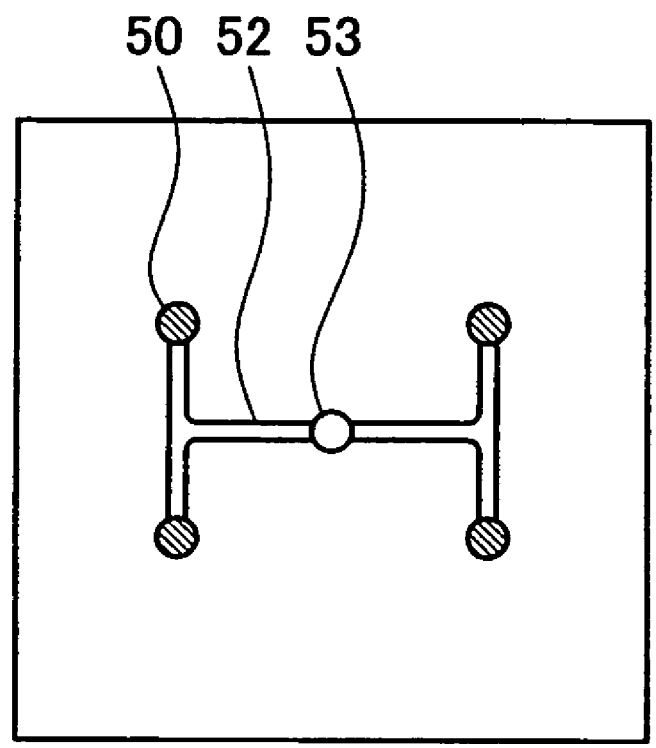
FIG. 6 is a sectional view of an example (4-cavity molding) of a runner pattern in the molds in the first embodiment.

In the case of a 4-cavity mold shown in FIG. 6, for example, two flow channels (runners 52) extend from the sprue 53. Each runner 52 is branched at right angles into two flow channels extending in opposite directions from a branch point, like a letter T. An end of each branch channel is formed with the shape transfer section 50. In other words, when branched once, each runner 52 reaches the shape transfer sections 50.

Figure 7A:
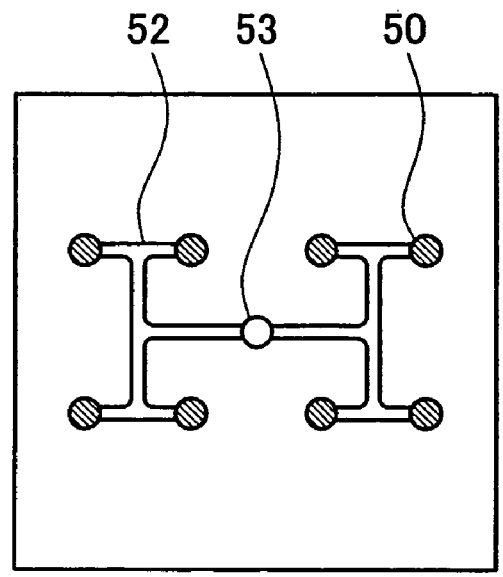
FIG. 7A is a sectional view of another example (8-cavity molding) of the runner pattern in the molds in the first embodiment.
Figure 7B:
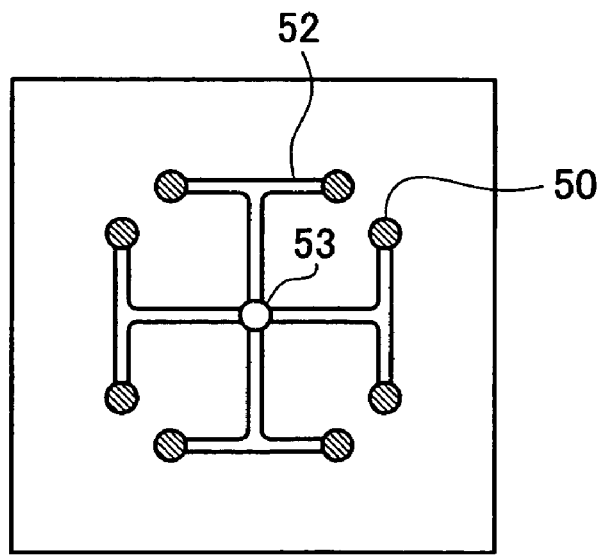
FIG. 7B is a sectional view of another example (8-cavity molding) of the runner pattern in the molds in the first embodiment.

In the case of an 8-cavity mold shown in FIG. 7A, two flow channels (runners 52) extend from the sprue 53. Each runner 52 is branched at right angles into two flow channels extending in opposite directions from a branch point, and each branch channel is further branched at right angles into two flow channels extending in opposite directions from a branch point. An end of each branch channel is formed with the shape transfer section 50. In other words, when branched twice, each runner 52 reaches the shape transfer sections 50. Further, in the case of an 8-cavity mold shown in FIG. 7B, four flow channels (runners 52) extend from the sprue 53. Each runner 52 is branched at right angles into two flow channels extending in opposite directions from a branch point. An end of each branch channel is formed with the shape transfer section 50. In other words, when branched once, each runner 52 reaches the shape transfer sections 50.

Figure 8A:
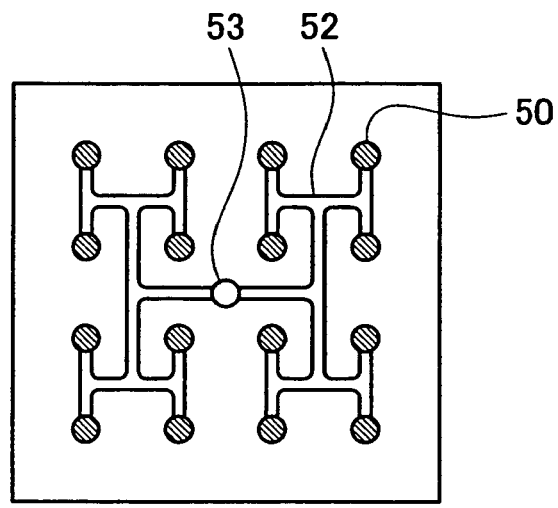
FIG. 8A is a sectional view of another example (16-cavity molding) of the runner pattern in the molds in the first embodiment.
Figure 8B:
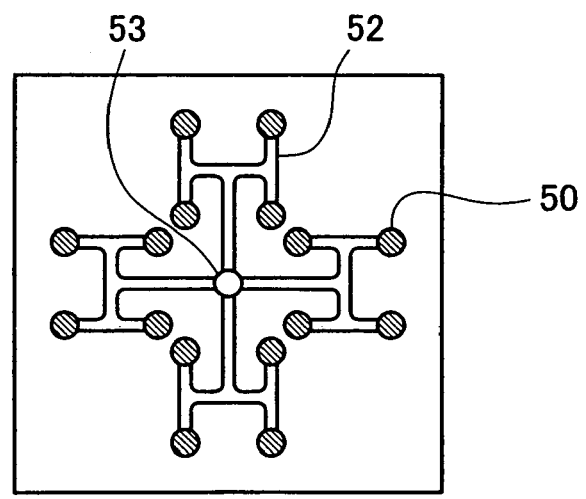
FIG. 8B is a sectional view of another example (16-cavity molding) of the runner pattern in the molds in the first embodiment.

In the case of 16-cavity mold shown in FIG. 8A, two flow channels (runners 52) extend from the sprue 53. Each runner 52 is branched at right angles three times and reaches the shape transfer sections 50. In the case of 16-cavity mold shown in FIG. 8B, four flow channels (runners 52) extend from the sprue 53. Each runner 52 is branched at right angles twice and reaches the shape transfer sections 50.

Figure 9:
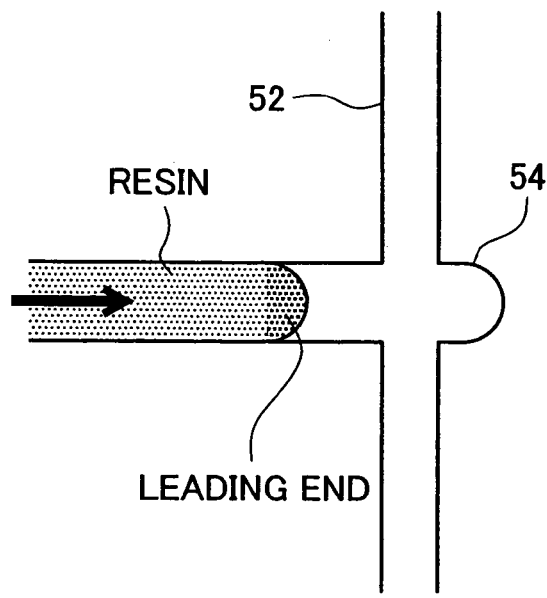
FIG. 9 is an explanatory view showing a resin receiving portion of the runner in the first embodiment.
Figure 9:
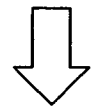
Figure 9:
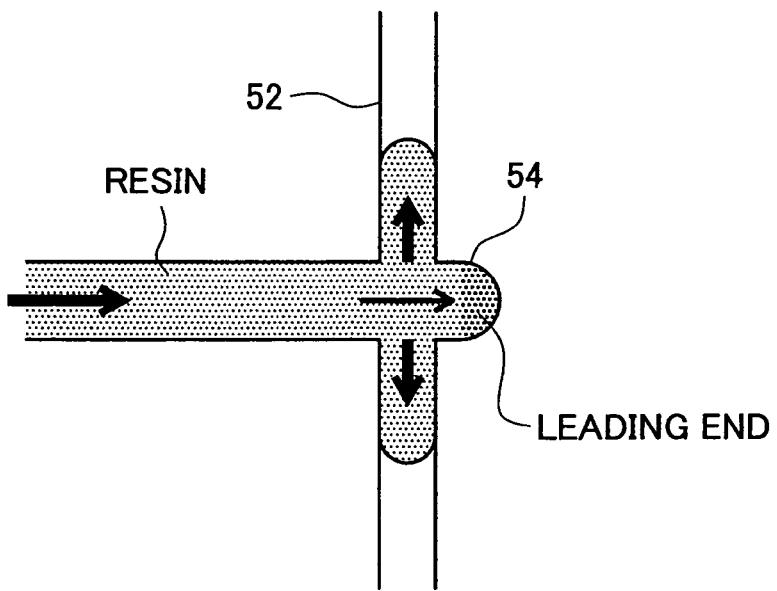

In every pattern, the length of each runner 52 between the junction with the sprue 53 and each corresponding shape transfer section 50 is almost the same. It is further preferable to branch the runner 52 once, twice, or three times, and provide a receiving portion at each branch point. This is on the following reason. Specifically, the temperature of molten resin flowing in the runner 52 is as extremely high as 200° C. to 300° C. On the other hand, the temperature of the mold is as low as 70° C. to 150° C. Accordingly, the temperature of molten resin at the leading end of flow is likely to decrease. This temperature decrease remarkably appears as the runner diameter is smaller. When the runner 52 is branched at some midpoint thereof as shown in FIG. 9 and the resin receiving portion 54 is provided at the branch point, therefore, the resin of which the temperature has decreased is allowed to stay in the receiving portion 54. This makes it possible to maintain the resin which will flow in the shape transfer section 50 at a high temperature. The transferability can be improved accordingly. The resin receiving portion 54 may be provided in any position instead of the branch point in the runner 52. For example, it may be provided in a bend portion in the case where the runner 52 is bent at some midpoint thereof.

When the number of branching or bending each runner 52 is four or more, resistance in the flow channel is increased. As the resistance is increased, the pressure loss in the branch or bend portions becomes large, which interferes with the dwelling to the shape transfer section 50, resulting in a decrease in transferability. To avoid such defects, it is preferable that the number of branching or bending the runner 52 is three or less.

Figure 10:
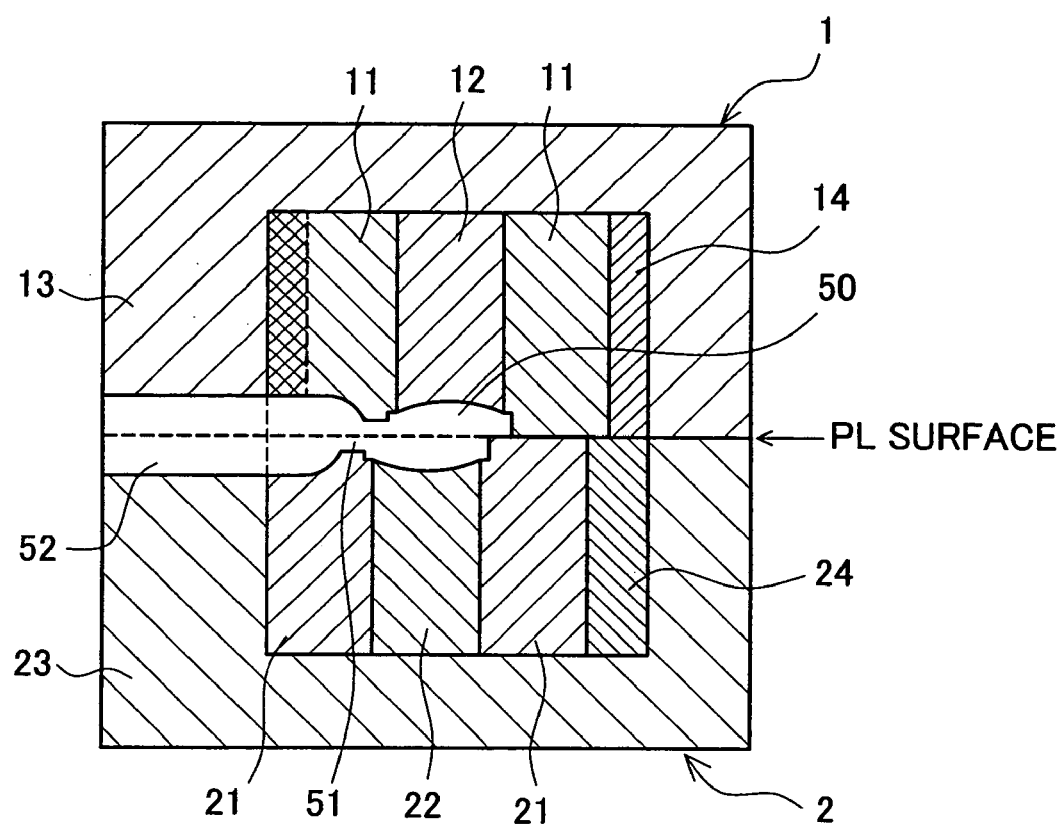
FIG. 10 is a view schematically showing a position adjusting mechanism of a cavity (before adjustment) in the first embodiment.
Figure 11:
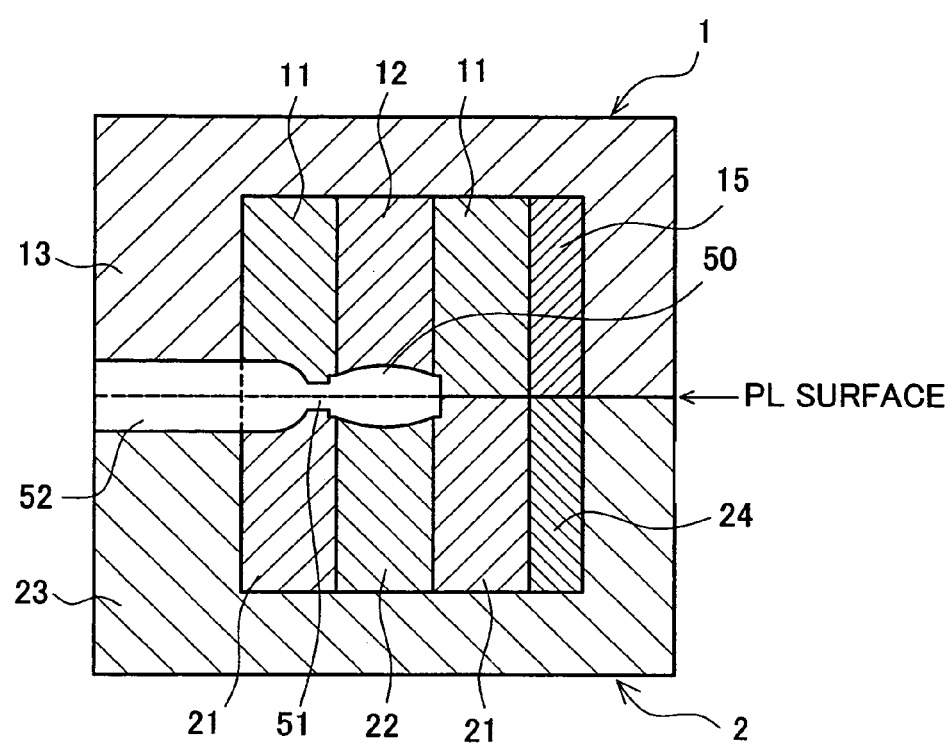
FIG. 11 is a view schematically showing the position adjusting mechanism of the cavity (after adjustment) in the first embodiment.

An example of the position adjustment of the cavity 11 will be explained below. In the molds, as shown in FIG. 10, a gap between the cavity and the base mold is filled with spacer blocks 14 and 24. FIG. 10 shows the fixed mold 1 and the movable mold 2, including the optical axes of respective lens portions are misaligned. In the molds shown in FIG. 10, the width of the cavity 11 in the fixed mold 1 is wider by an amount corresponding to a cross hatching area in FIG. 10 than the width of the cavity 21 in the movable mold 2. Thus, deviation is caused between respective optical axes. For this reason, part of the cavity 11 in the fixed mold 1 is cut off by an amount corresponding to the deviation (i.e., the cross hatching portion in FIG. 10) by a cutting process or the like. Then, a new spacer block 15 is inserted in the space generated after the cutting as shown in FIG. 11 to compensate the positional deviation.

In the molds in the present embodiment, the pattern of the runners 52 is designed using two perpendicularly intersecting directions and the cavity 11 of rectangular shape is arranged so that the outer surface thereof is in parallel with the outer surface of base mold 13. Accordingly, the horizontal and vertical directions of the base mold 13 can be matched to the directions for adjustment of axial deviation. Evaluations of eccentricity of each surface of a molded product (an axial deviation between the optical axes of the lens portions in the fixed mold 1 and the movable mold 2) may be made on only measurements relative to two intersecting axes. Thus, it is possible to easily determine the adjustment amount (distance) and direction of the position of the cavity 11.

In the molding machine 100 in the first embodiment as explained above, the total projected area of all runners 52 is determined within a range of 1.0 cm$^2$ to 12.0 cm$^2$ and the pattern of the runners 52 is designed to allow molding of four or more molded products. Further, the runner diameter and length are determined to realize the projected area in the above range. This makes the runner diameter of the runner 52 smaller and the cooling time of the runner 52 shorter. Also, the runner length of the runner 52 is shorter, which provides good transferability to the shape transfer section 50. Consequently, the optical component molding apparatus for molding small-sized and high-precise optical components in plural number can be achieved with good transferability and a reduced production cycle.

The pattern of the runners 52 is configured in the two perpendicularly intersecting directions. Further, the outer shape of the cavity 11 seen from the pressure-contact surface side is rectangular, and the cavity 11 is arranged so that the outer surface thereof is in parallel with the outer surface of the base mold 13. Accordingly, the horizontal and vertical directions of the base mold 13 can be matched to the adjustment directions for axial deviation. The evaluations of eccentricity of a molded product is required only relative to the two intersecting axes. The position adjustment of the transfer member is required only relative to the two intersecting axes. Consequently, it is easy to evaluate the eccentricity of the molded product and adjust the position of the transfer member.

The molding machine 100 is a so-called compact molding machine capable of generating a mold-clamping force of 15 tons (150 kN) or less. Since the total projected area of the runners is as small as 1.0 cm$^2$ to 12.0 cm$^2$. It is accordingly sufficient that the mold-clamping force is 15 tons at the maximum. Such molding machine 100 can achieve space saving and energy saving.

In the molding machine 100, furthermore, each runner 52 is bent once to third times between the sprue 53 and the gate 51. In each bend portion there is provided the resin receiving portion 54. In other words, providing of the resin receiving portion 54 makes it possible to allow the leading end (a low temperature part) of the molten resin to stay in the resin receiving portion 54. It is therefore possible to maintain the resin which will flow in the shape transfer section at a high temperature and provide good transferability.

Second Embodiment

A molding machine in the second embodiment includes, as in the first embodiment, a fixed platen provided with a fixed mold and a movable platen provided with a movable mold. The molding machine in this embodiment is a compact molding machine capable of generating a mold-clamping force of the order of 15 tons (150 kN). This molding machine is arranged to mold four to sixteen products in a single mold-clamping operation.

As in the first embodiment, each mold includes a base mold, a cavity, and a core. These cavity and core are structured as an insert in the base mold (see FIG. 3). Further, in the same manner as in the first embodiment, the total projected area of the runners is determined within a range of 1.0 cm$^2$ to 12.0 cm$^2$. The runner diameter and length are determined to realize the total projected area in the above range.

Figure 12:
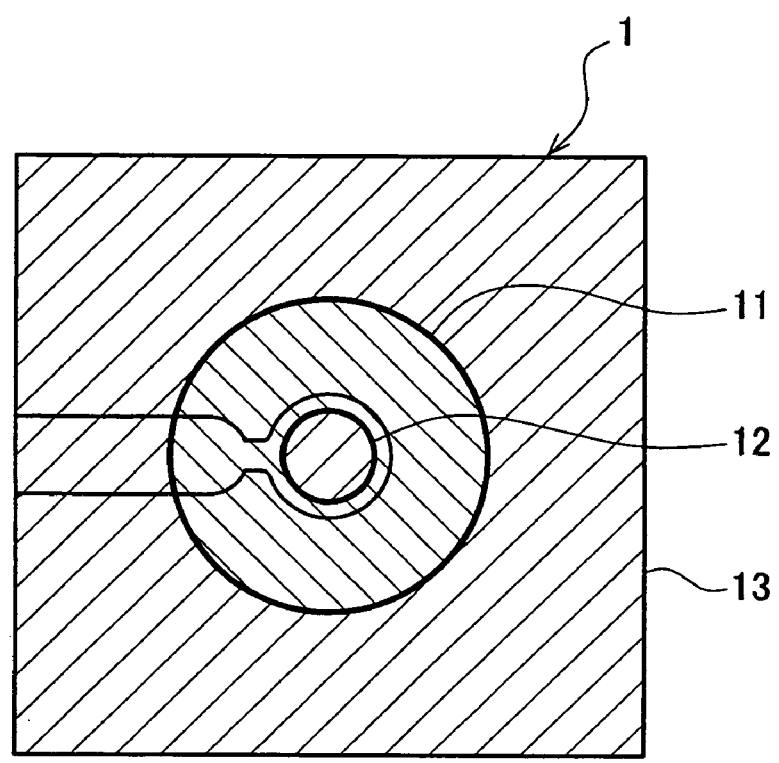
FIG. 12 is a view showing a pressure-contact surface of a mold for plastic lens in a second preferred embodiment.

The molding machine in the present embodiment differs in the shape of cavity from that in the first embodiment. Specifically, when seen from the pressure-contact surface side, each of a cavity 11 and a core 12 is of a circular outer shape as shown in FIG. 12.

To be concrete, a base mold 13 is provided with a pocket (recess) for receiving the cavity 11. This cavity 11 is provided with a pocket (recess) for receiving the core 12. Thus, the cavity 11 is fit in the recess of the base mold 13 and further the core 12 is fit in the recess of the cavity 11. Each of the cavity 11 and the core 12, which is circular when seen from the pressure-contact surface side, is arranged to be rotatable. This rotation allows adjustment of the position of the core 12. This position adjustment of the core 12 will be mentioned later in detail.

The molds of the molding machine in the present embodiment differ in runner pattern from those in the first embodiment. Each mold is formed with a plurality of runners 52 radially extending around a sprue 53. The runners 52 each extending from the junction with the sprue 53 to each shape transfer section 50 are of almost the same length. Each runner 52 may be branched or bent once to third times between the junction with the sprue and each shape transfer section 50.

Figure 13:
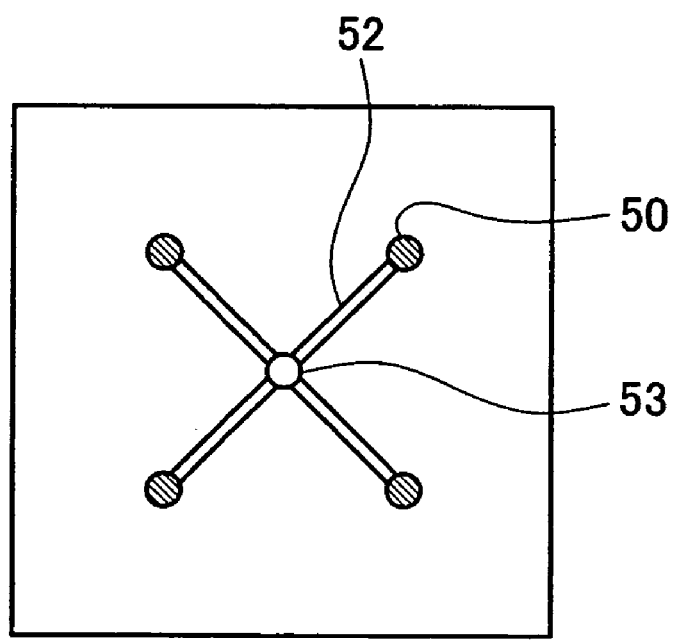
FIG. 13 is a sectional view of an example (4-cavity molding) of a runner pattern in the molds in the second embodiment.
Figure 14A:
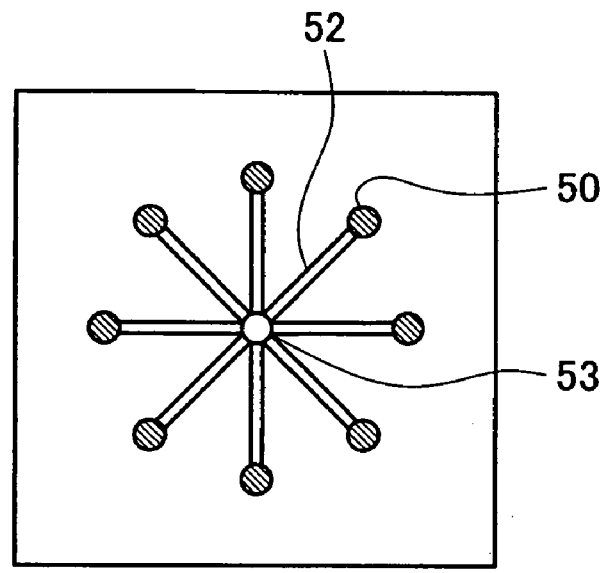
FIG. 14A is a sectional view of another example (8-cavity molding) of the runner pattern in the molds in the second embodiment.
Figure 14B:
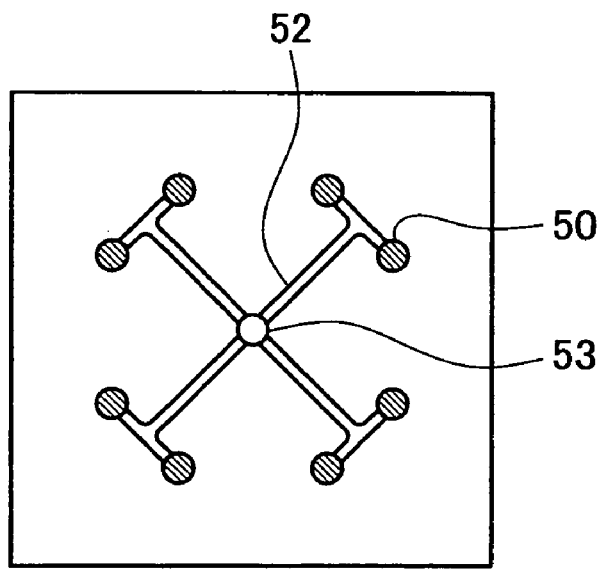
FIG. 14B is a sectional view of another example (8-cavity molding) of the runner pattern in the molds in the second embodiment.
Figure 15A:
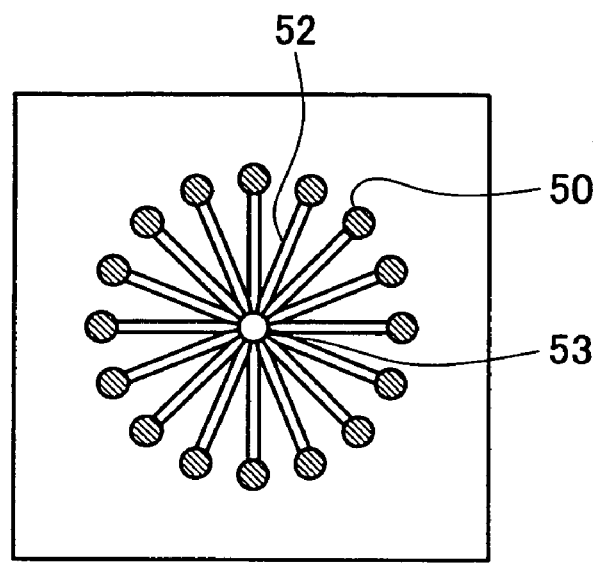
FIG. 15A is a sectional view of another example (16-cavity molding) of the runner pattern in the molds in the second embodiment.
Figure 15B:
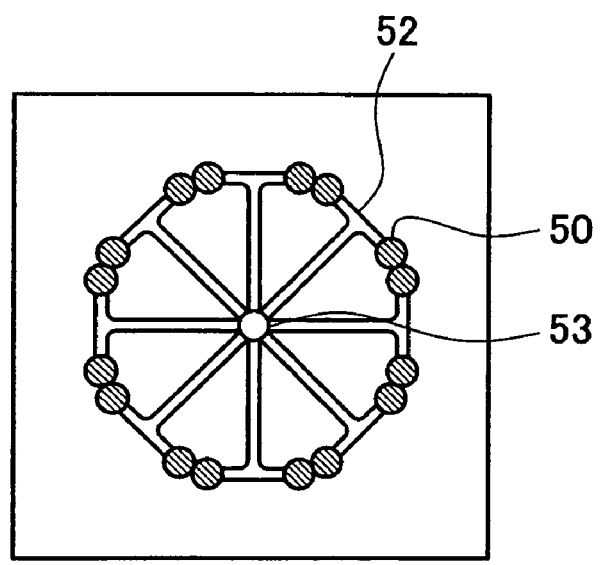
FIG. 15B is a sectional view of another example (16-cavity molding) of the runner pattern in the molds in the second embodiment.
Figure 16A:
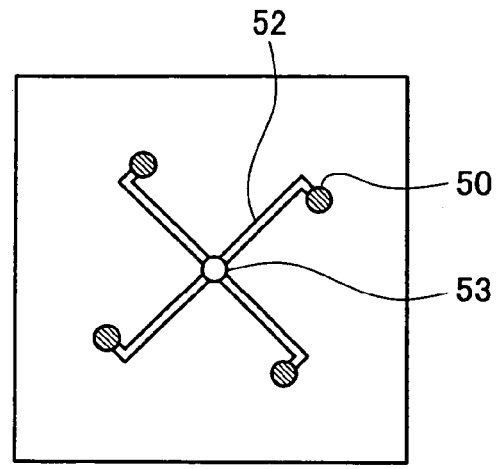
FIG. 16A is a sectional view of an example (bend) of a runner pattern in the molds in the second embodiment.
Figure 16B:
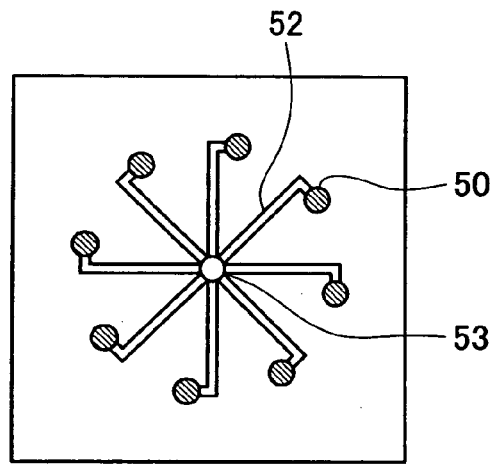
FIG. 16B is a sectional view of another example (bend) of the runner pattern in the molds in the second embodiment.
Figure 16C:
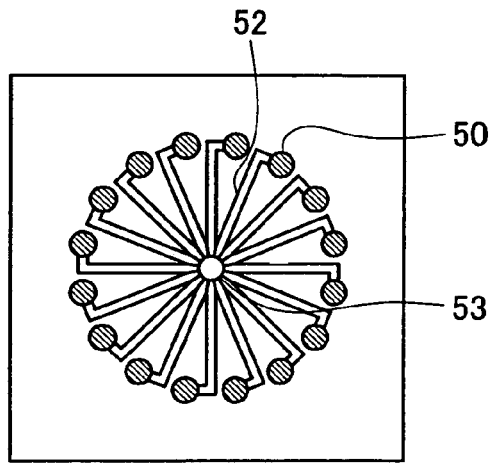
FIG. 16C is a sectional view of another example (bend) of the runner pattern in the molds in the second embodiment.

The pattern of the runners 52 for multi-cavity molding is exemplified in FIG. 13 (4-cavity), FIGS. 14A and 14B (8-cavity), and FIGS. 15A and 15B (16-cavity). Further, FIGS. 16A, 16B, and 16C show examples of bending pattern of the runners 52. It will be understood that those patterns are merely examples and the configuration of core and cavity is not limited to the following patterns.

For instance, in the case of a 4-cavity mold shown in FIG. 13, four flow channels (runners 52) are formed extending from the sprue 53. Specifically, the runners 52 are arranged to radially extend from the sprue 53. The shape transfer section 50 is provided in an end of each runner 52.

In the case of an 8-cavity mold shown in FIG. 14A, eight flow channels (runners 52) are formed extending from the sprue 53. Further, in the case of another 8-cavity mold shown in FIG. 14B, four flow channels (runners 52) are formed extending from the sprue 53. Each runner 52 is branched into two branch channels and provided with the shape transfer section 50 at each end. In other words, when branched once, the runner 52 reaches the shape transfer sections 50 respectively.

In the case of a 16-cavity mold shown in FIG. 15A, sixteen flow channels (runners 52) radially extend from the sprue 53. In the case of another 16-cavity mold shown in FIG. 15B, eight flow channels (runners 52) extend from the sprue 53 and further are branched once to reach the shape transfer sections 50 individually.

Figure 17:
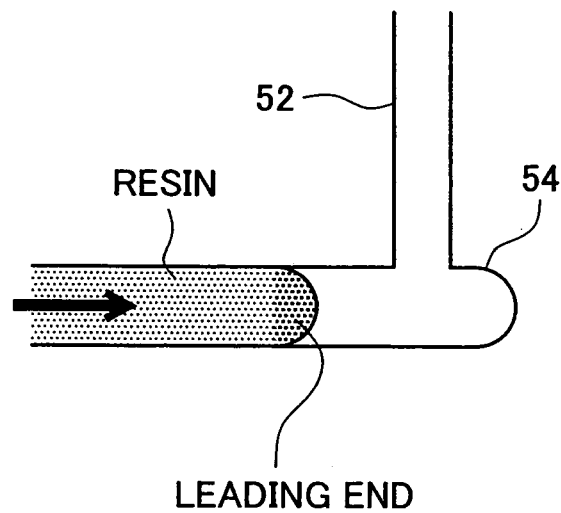
FIG. 17 is an explanatory view showing a resin receiving portion of the runner in the second embodiment.
Figure 17:
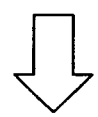
Figure 17:
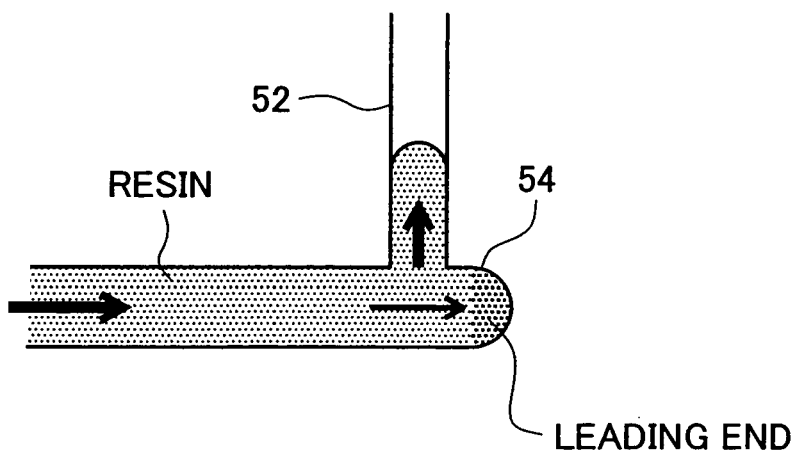

As shown in FIGS. 16A, 16B, and 16C, the runners 52 may be arranged in bending patterns so that each runner 52 is bent at a right angle. A resin receiving portion is also provided in an end of a bend portion of each runner 52. The temperature of molten resin which will flow in each runner 52 is as extremely high as 200° C. to 300° C. On the other hand, the temperature of the mold is as low as 70° C. to 150° C. Accordingly, the temperature of molten resin at the leading end of flow is likely to decrease. This temperature decrease remarkably appears as the runner diameter is smaller. The runner 52 is bent at some midpoint thereof as shown in FIG. 17 and a resin receiving portion 54 is provided at the end of the bend portion. Thus, the resin of which the temperature has decreased is allowed to stay in the receiving portion 54. This makes it possible to maintain the resin which will flow in the shape transfer section 50 at a high temperature. The transferability can be improved accordingly. The resin receiving portion 54 may be provided in any position instead of the bend portion in the runner 52. For example, it may be provided in a branch point in the case where the runner 52 is branched at some midpoint thereof.

Figure 18:
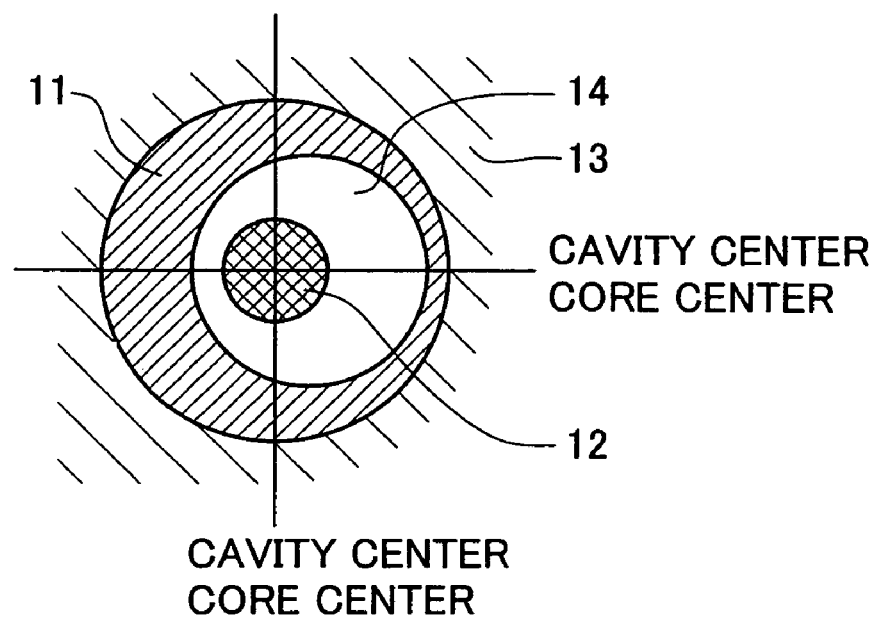
FIG. 18 is a view (part 1) schematically showing a position adjusting mechanism of a cavity in the second embodiment.

An example of the position adjustment of the cavity 12 will be explained below. In the molds in the present embodiment, as shown in FIG. 18, the cavity 11 of a columnar shape (circular in section) is inserted in the base mold 13. In this cavity 11, an eccentric sleeve 14 of a columnar shape is inserted. Further, a columnar core 12 is inserted in the eccentric sleeve 14. The eccentric sleeve 14 is eccentric by a predetermined distance relative to the core 12 and also relative to the cavity 11. FIG. 18 shows a state where the center of the core 12 coincides with the center of the cavity 11.

Figure 19:
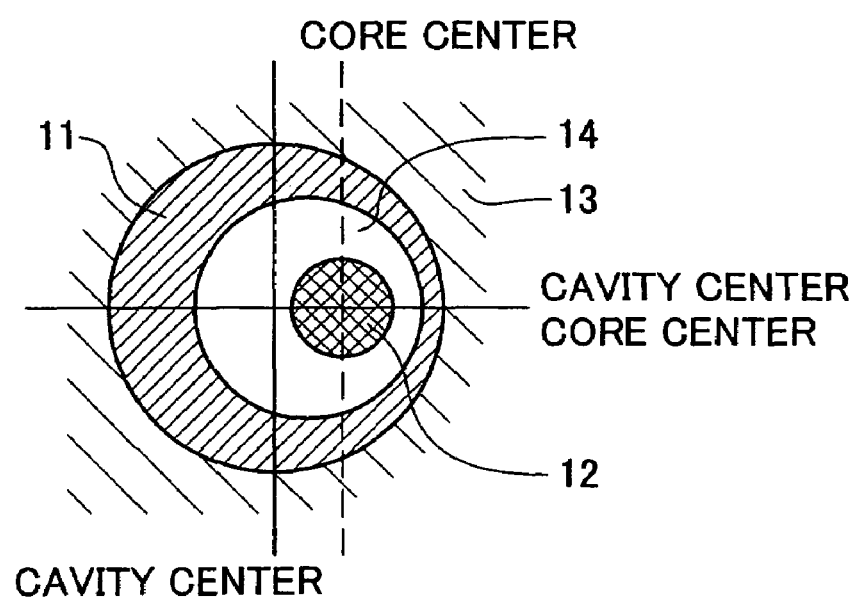
FIG. 19 is a view (part 2) schematically showing the position adjusting mechanism of the cavity in the second embodiment.
Figure 20:
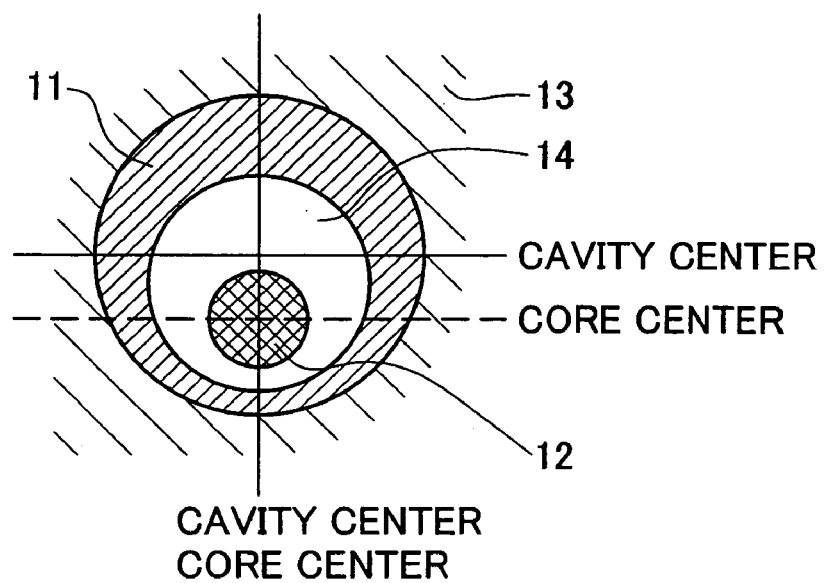
FIG. 20 is a view (part 3) schematically showing the position adjusting mechanism of the cavity in the second embodiment.

In the molds in the present embodiment, the position of the core 12 can be changed by rotation of the eccentric sleeve 14. FIG. 19 shows a state where the eccentric sleeve 14 has been rotated 180° from the state shown in FIG. 18. Specifically, with the 180'-rotation of the eccentric sleeve 14, the center of the core 12 can be moved away from the center of the cavity 11. In the molds in the present embodiment, the position of the core 12 can also be changed by rotation of the cavity 11. FIG. 20 shows a state where the cavity 11 has been rotated 90° from the state shown in FIG. 19. To be more specific, the center of the core 12 can also be moved by the rotation of the cavity 11. By simple rotation of the cavity 11 and the eccentric sleeve 14, a positional deviation can be compensated.

If a transfer member having a rectangular outer shape as shown in the first embodiment is inserted in the mold including the runners 52 arranged in the radially extending pattern, an unnecessary space is formed, leading to a large-sized base mold. This may also result in an increase in runner length. It is therefore preferable to insert a transfer member having a circular outer shape seen from the pressure-contact surface side in the mold in the case where the runners 52 are configured in the radially extending pattern as shown in the present embodiment.

In the molding machine in the second embodiment as explained above in detail, the total projected area of the runners 52 is determined within a range of 1.0 cm² to 12.0 cm² and the pattern of the runners 52 is designed to allow molding of four or more molded products. Further, the runner diameter and length are determined to achieve the above range. This makes the runner diameter of the runner 52 smaller and the cooling time of the runner 52 shorter. Also, the runner length of the runner 52 is shorter, which provides good transferability to the shape transfer section 50. Consequently, the optical component molding apparatus for molding small-sized and high-precise optical components in plural number can be achieved with good transferability and a reduced production cycle.

The pattern of the runners 52 is configured to extend the runners 52 radially from the sprue 53. Furthermore, the cavity 11 is of the circular outer shape when seen from the pressure-contact surface side. The cavity 11 therefore can be subject to a simultaneous processing and a circumferential processing, thereby providing enhanced finishing accuracy such as roundness and coaxiality. For the cavity 11 having the circular outer shape, it is possible to simultaneously and circumferentially process the outer periphery of the cavity 11 and the inner periphery of same for insertion of the core 12. In the case where a transfer surface for the flange portion of a lens is to be formed in the cavity 11, the inner and outer peripheries of the cavity 11 can be processed circumferentially together with the transfer face. Accordingly, the cavity 11 can be produced with high precision. Such simultaneous and circumferential processing may include for example lathing. For the cavity 11 having the rectangular outer shape, on the other hand, such coaxial and simultaneous processing is unavailable. It is therefore necessary to replace parts for each processing. Further, processing for several microns to submicrons is hard.

When the cavity 11 is of the circular outer shape, it can be subject to high precise decentering processing. Accordingly, a transfer member can be decentered in advance. By rotation of this transfer member, high-precise position adjustment can be facilitated. Moreover, since the cavity 11 can be subject to the simultaneous processing, it is particularly effective to mold a lens having an optical surface with a fine structure (e.g., an optical path difference providing structure).

In the case where a plurality of small optical components is to be molded as in the first and second embodiments, the total projected area of the runners 52 constitutes most of the total projected area. The total projected area of the runners 52 is determined within the above mentioned range to reduce the total projected area, thus reducing a mold-clamping force needed for molding. Therefore, downsizing of the molding machine can be realized. Energy saving and space saving can also be improved. It is further possible to reduce the volume of resin needed in each runner, thereby reducing material costs of waste materials.

Figure 21:
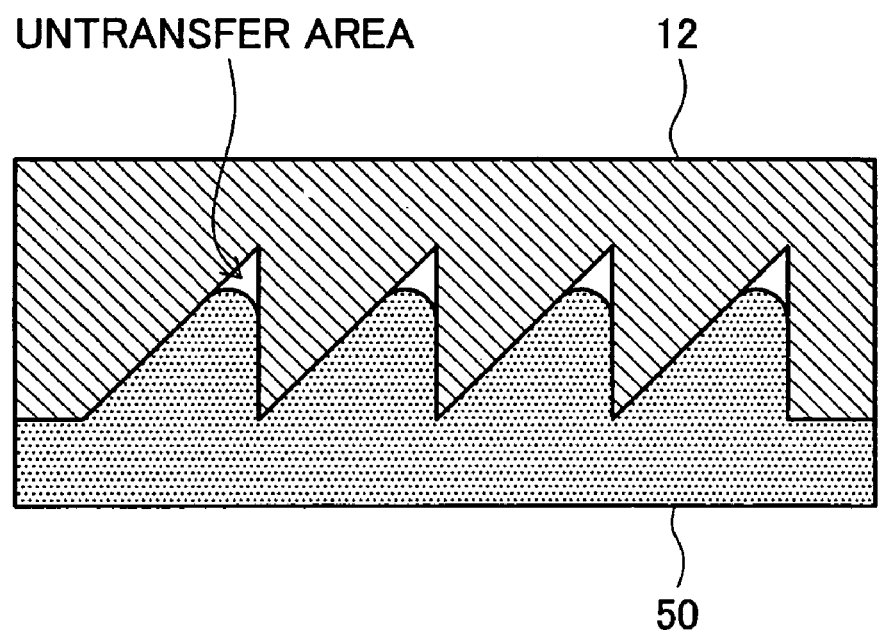
FIG. 21 is a view explaining the transferability for a diffractive lens, showing bad transferability.

In the case of molding a lens having the optical surface with the optical path difference structure, such as a diffractive lens, the transferability has a large influence on yields. In other words, if the transferability is low, resin cannot be filled sufficiently up to each end of grooves formed in the transfer surface as shown in FIG. 21. This may damage the optical characteristics of the molded lens. The molding machine 100 structured as above in the embodiments has good transferability. Thus, resin can be filled sufficiently up to each end of grooves formed in the transfer surface as shown in FIG. 22. It is particularly effective to mold optical components with the optical path difference structure on the transfer surface.

It should be understood that the above embodiments are merely examples and the present invention is not limited thereto. The present invention may be embodied in other specific forms without departing from the essential characteristics thereof. For instance, the injection unit, which is not limited to the preplasticization type and the in-line screw type, may be for example an in-line plunger type.

In the molding machine 100 in the present embodiments, the mold for molding the plastic lens is structured as a core and a cavity separately, but it is not limited thereto. That is, the mold may be configured as an integrated combination of a core and a cavity (that the transfer section for the lens portion and the transfer section for the flange portion are integrally provided).

As for the optical component as the product to be molded, when the plastic resin as the base material is mixed with fine particles, the mixing method thereof is not particularly limited. Any of the following methods may be employed. That is, a method in which, after the plastic resin and the fine particles are prepared independently, both are mixed with each other; a method in which the plastic resin is prepared under such a condition that prepared fine particles are included; a method in which the fine particles are prepared under such a condition that prepared plastic resin is existing; a method in which both of the plastic resin and the fine particles are prepared simultaneously etc. In particular, there is an appropriate method in which, for example, one solution in which the plastic resin is solved and the other solution in which the fine particles are uniformly dispersed are mixed uniformly; thus, by mixing the plastic resin, which is poor in solubility, with a solution, an intended composition of matters is obtained. However, the mixing method is not limited to the above.

Additionally, the mixing level between the plastic resin and the fine particles in the optical component is not particularly limited. However, it is preferred that both are mixed uniformly. In the case where the level of mixing is insufficient, particularly, the optical characteristics such as refractive index, Abbe's number and transmission of a light beam may be influenced. And further, the processing performance of the resin such as thermal plasticity, molten-plasticity and the like may be influenced. Since the level of mixing may be influenced by the preparation method thereof, an appropriate method should be selected while taking into consideration the characteristics of the plastic resin and the fine particles. In order to uniformly mix both of the plastic resin and the fine particles, a method in which the plastic resin and the fine particles are directly combined may be appropriately employed.

According to the present invention, as obvious from the above description, the optical component molding apparatus for producing small-sized and high-precise optical components can be achieved with good transferability and a reduced production cycle.

What is claimed is:

1. An optical component molding apparatus for producing a plurality of optical components, the apparatus comprising:
   a fixed mold;
   a movable mold configured to contact the fixed mold under pressure along a first direction;
   the moveable mold and the fixed mold defining a plurality of shape transfer sections within, and providing a plurality of runners configured to direct a flow of molten resin material from a sprue into respective shape transfer sections to produce the plurality of optical components;
   each optical component having an outer diameter between 2 mm and 12 mm and an optical surface with surface roughness of 20 nm or less; and
   wherein a total area projected by all of the runners combined, relative to a plane orthogonal to the first direction, is between 1 cm$^2$ and 12 cm$^2$, and at least four optical components are molded in one mold-clamping operation.

2. The optical component molding apparatus according to claim 1, wherein the runners are arranged in a pattern having two perpendicularly intersecting segments.

3. The optical component molding apparatus according to claim 2, further comprising a transfer member which is insertable into at least one of the moveable mold and the fixed mold and is of a rectangular outer shape when seen from a pressure-contact surface side, wherein the shape transfer section is provided in the transfer member.

4. The optical component molding apparatus according to claim 1, wherein the runners are arranged in a pattern radially extending from the sprue.

5. The optical component molding apparatus according to claim 4, further comprising a transfer member which is insertable into at least one of the moveable mold and the fixed mold and is of a rectangular outer shape when seen from a pressure-contact surface side, wherein the shape transfer section is provided in the transfer member.

6. The optical component molding apparatus according to claim 1, wherein the movable mold is brought into contact under pressure with the fixed mold at a clamping force of 150 kN or less.

7. The optical component molding apparatus according to claim 1, wherein each runner is formed having one to three bent portions between the sprue and a gate, and a resin receiving portion is formed in each bent portion.

8. The optical component molding apparatus according to claim 1, wherein the shape transfer section is provided with steps in a circular zone around an optical axis of the optical component to be molded.

9. The optical component molding apparatus according to claim 1, wherein the optical component to be molded has an outer diameter in a range of 2 mm to 7 mm.

10. An optical component molding apparatus for producing a plurality of optical components, the apparatus comprising:
    a fixed mold;
    a movable mold configured to contact the fixed mold under pressure along a first direction;
    the moveable mold and the fixed mold defining a plurality of shape transfer sections within, and providing a plurality of runners configured to direct a flow of molten resin material into the respective shape transfer sections to produce the plurality of optical components, each optical component having an outer diameter between 2 mm and 12 mm and an optical surface with surface roughness of 20 nm or less;
    each runner having at least one bent portion defining a first segment and a second segment in communication with each other through the bent portion;
    at least one of the first and second segments including a resin receiving terminal portion extending for a predetermined distance past the bent portion along an axis of the segment, the terminal portion configured to receive and retain a cooled portion of the molten resin material; and
    wherein a total projected area of all of the runners combined, relative to a plane orthogonal to the first direction, is between 1 cm$^2$ and 12 cm$^2$, and at least four optical components are molded in one mold-clamping operation.

* * * * *